(12) United States Patent
Baudry et al.

(10) Patent No.: US 8,064,635 B2
(45) Date of Patent: Nov. 22, 2011

(54) METHOD FOR WATERMARKING A DIGITAL DATA SET AND DEVICE IMPLEMENTING SAID METHOD

(75) Inventors: Séverine Baudry, Rennes (FR); Corinne Naturel, Rennes (FR); Philippe Nguyen, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 828 days.

(21) Appl. No.: 12/086,573

(22) PCT Filed: Dec. 11, 2006

(86) PCT No.: PCT/EP2006/069556
§ 371 (c)(1),
(2), (4) Date: Jun. 16, 2008

(87) PCT Pub. No.: WO2007/068675
PCT Pub. Date: Jun. 21, 2007

(65) Prior Publication Data
US 2010/0166251 A1 Jul. 1, 2010

(30) Foreign Application Priority Data
Dec. 16, 2005 (FR) ....................................... 05 53905

(51) Int. Cl.
*G06K 9/00* (2006.01)
*H04N 11/02* (2006.01)
(52) U.S. Cl. ...................... 382/100; 382/250; 375/240.2
(58) Field of Classification Search .................. 382/100, 382/103, 168, 170, 172, 173, 181, 184, 191, 382/201, 232–236, 250, 254, 260, 274–295, 382/312; 375/240.15, 240.01, 149, 240.2
See application file for complete search history.

(56) References Cited

U.S. PATENT DOCUMENTS

| | | | | |
|---|---|---|---|---|
| 7,305,104 B2 * | 12/2007 | Carr et al. | ...................... | 382/100 |
| 7,386,049 B2 * | 6/2008 | Garrido et al. | ........... | 375/240.15 |
| 7,424,131 B2 * | 9/2008 | Alattar et al. | ................. | 382/100 |
| 7,693,300 B2 * | 4/2010 | Reed et al. | .................... | 382/100 |
| 7,822,225 B2 * | 10/2010 | Alattar | .......................... | 382/100 |

FOREIGN PATENT DOCUMENTS
WO    WO 02/085033    * 10/2002

OTHER PUBLICATIONS

G. Doerr et al.: "A guide tour of video watermarking", Signal Processing. Image Communication; Elsevier Science Publishers, vol. 18, No. 4, Apr. 2003, pp. 263-282.

(Continued)

*Primary Examiner* — Seyed Azarian
(74) *Attorney, Agent, or Firm* — Robert D. Shedd; Jeffrey M. Navon

(57) ABSTRACT

The invention relates to a method of watermarking a data set comprising the steps of:
 selecting, in the data set, at least one group of two data; and
 modifying at least one data of the group.
The data is modified such that the difference between the modified data and the other data of the group possibly modified equals a predefined watermarking parameter multiplied by an integer number, called rejection class, associated with the group and equal to the integer nearest to the ratio between the difference between the at least one data and the other data of the group before the modification divided by the watermarking parameter.

11 Claims, 4 Drawing Sheets

OTHER PUBLICATIONS

P.Campisi et al: "Object-based quality of service assessment using semi-fragil tracing watermarking in mpeg-4 video cellular services" Proceedings 2002 Inter'l Conf. on Image Processing, Sep. 22-25, 2002, IEEE, US, vol. vol. 2 of 3, pp. 881-884.

P. Campisi et al: "Blind Quality Assessment System for Multimedia Communications Using Tracing Watermarking", IEEE Transactions on Signal Processing, IEEE Service Center, vol. 51, No. 4, Apr. 2003, pp. 996-1002.

Search Report Dated Feb. 19, 2007.

* cited by examiner

METHOD FOR WATERMARKING A DIGITAL DATA SET AND DEVICE IMPLEMENTING SAID METHOD

This application claims the benefit, under 35 U.S.C. §365 of International Application PCT/EP2006/069556, filed Dec. 11, 2006, which was published in accordance with PCT Article 21(2) on Jun. 21, 2007 in English and which claims the benefit of French patent application No. 0553905, filed Dec. 16, 2005.

1. FIELD OF THE INVENTION

The invention relates to a method of watermarking a digital data set. The invention also relates to a device implementing said method. Besides, the invention relates to a method and a device for automatic estimation of the subjective quality of the data set, such as a sequence of images or video, after transmission/processing using watermarking techniques.

2. PRIOR ART

In numerous technical fields, it is necessary to measure the quality of an image, of a sequence of images or video, or more exactly the degradation in quality resulting from processings applied to the video. For example, during a digital transmission, the video will be compressed (e.g. to the MPEG2 format), inserted into transport streams and transmitted by satellite or by cable etc. The compression will cause a degradation in the perceptual quality of the video (block effects, noise etc.) that is all the more significant the lower the bit rate. Furthermore, during the satellite transmission of the binary stream the latter may be noisy and the corresponding MPEG stream no longer compliant. This will result in receiver side decoding errors which may have more or less annoying consequences: "freezing" of images, black images, erroneous image blocks etc. It is therefore often necessary to supervise the quality of the video along the transmission chain. This operation when it is done by a human operator is expensive, all the more so the larger the number of channels to be measured. This is why, it is often preferable to use an automatic device making it possible to estimate an objective quality. Among the numerous metrics of quality which exist, one of the simplest is the PSNR ("Peak Signal Noise Ratio"), defined on the basis of the mean square error, denoted MSE, between the original video and the distorted video. However, it is known that this measurement is weakly correlated with the visual quality perceived by man. Thus, two videos of like PSNR may correspond to very different subjective qualities. This is why, numerous more or less complex models of the human visual system have been developed (e.g. Watson model, JND, Scott Daly model etc.), on the basis of which more elaborate quality metrics than the PSNR have been derived. These metrics are in general closer to the subjective quality perceived by a human. They make it possible therefore to obtain a relatively reliable estimation of the subjective quality of a video. However, most of these metrics operate either by complete reference, that is to say on the basis of the entire original video and of the distorted video, or by reduced reference, that is to say only on the basis of the distorted video and of a "digest" of the original video. For example, during an application of monitoring broadcast on a transmission network, the quality measurements take place at the level of the receiver with a metric with complete reference. It is therefore necessary to convey and process a very significant quantity of data, i.e. the reference video, in general uncompressed, thereby requiring very high bit rate links. The problem is less significant with the metrics with reduced reference but nevertheless requires relatively significant bit rates to transmit the "digest" of the video.

Another known technique is to transmit a known video or test pattern on the transmission channel for example at regular time intervals to supervise the quality continuously. The receiver, knowing the original test pattern, can reconstruct it before estimating the objective quality by comparing the reconstructed test pattern and the transmitted test pattern. This solution makes it possible to avoid putting in place an auxiliary high bit rate channel. The test pattern can be chosen so as to measure certain artefacts precisely (e.g. frequency sensitivity/colorimetric sensitivity/spatial sensitivity). However such a technique is not usable in practice since it involves removing the useful video signal and is very intrusive, conspicuous, i.e. that it greatly disturbs the useful video signal.

3. SUMMARY OF THE INVENTION

The invention is aimed at alleviating at least one of the drawbacks of the prior art. More particularly, the invention relates to a method of watermarking a digital data set and also to a method of estimating the quality of a data set, such as a sequence of images or video, distorted during its transmission and/or during its processing on the basis of the watermarked data set.

The invention relates to a method of watermarking a data set comprising the steps of:
 selecting, in the data set, at least one group of two data; and
 modifying at least one data of the group.
According to the invention the at least one data is modified such that the difference between the modified data and the other data of the group possibly modified equals a predefined watermarking parameter multiplied by an integer number, called rejection class, associated with the group and equal to the integer nearest to the ratio between the difference between the at least one data and the other data of the group before the modification divided by the watermarking parameter.

According to a specific embodiment, the data set is made up of blocks of discrete cosine transformed coefficients, each block being representative of a block of image data and the two data belong to two different blocks.

The invention also relates to a method for estimating the quality after transmission and/or processing of a digital data set watermarked according to the above method. The quality is estimated on the basis of the transmitted and/or processed at least one group of two data and on the value of the predefined parameter.

According to a specific embodiment, the quality is estimated on the basis of auxiliary data representative of the rejection class associated to the at least one group.

Preferentially, the quality is in addition estimated based on psychovisual information.

According to a specific embodiment, the auxiliary data comprise, for each group of two data, the value of the associated rejection class.

According to another embodiment, the auxiliary data comprise, for each rejection class, the number of groups of two data whose associated rejection class equals the rejection class.

According to another embodiment, the auxiliary data comprise a value proportional to the sum over each group of two data of the squared value of the associated rejection class multiplied by the predefined parameter.

The invention also relates to a transmission system for transmitting a data set over a transmission channel comprising transmission means, reception means and an estimation device for estimating the quality of the data set transmitted by the transmission means to the reception means. The estimation device comprises a watermarking unit for watermarking the data set before transmission and an estimation unit for computing a quality value. According to the invention, the watermarking unit comprises:

means for selecting, in the data set, at least one group of two data; and means for modifying at least one data of the group such that the difference between the modified data and the other data of the group possibly modified equals a predefined watermarking parameter multiplied by an integer number, called rejection class, associated with the group and equal to the integer nearest to the ratio between the difference between the at least one data and the other data of the group before the modification divided by the watermarking parameter.

According to a preferred embodiment, the estimation unit comprises means for estimating the quality of the transmitted data set on the basis of the transmitted and/or processed at least one group of two data and on the value of the predefined parameter.

4. LISTS OF FIGURES

The invention will be better understood and illustrated by means of wholly nonlimiting advantageous exemplary embodiments and modes of implementation, with reference to the appended figures in which.

5. DETAILED DESCRIPTION OF THE INVENTION

Figure 1:
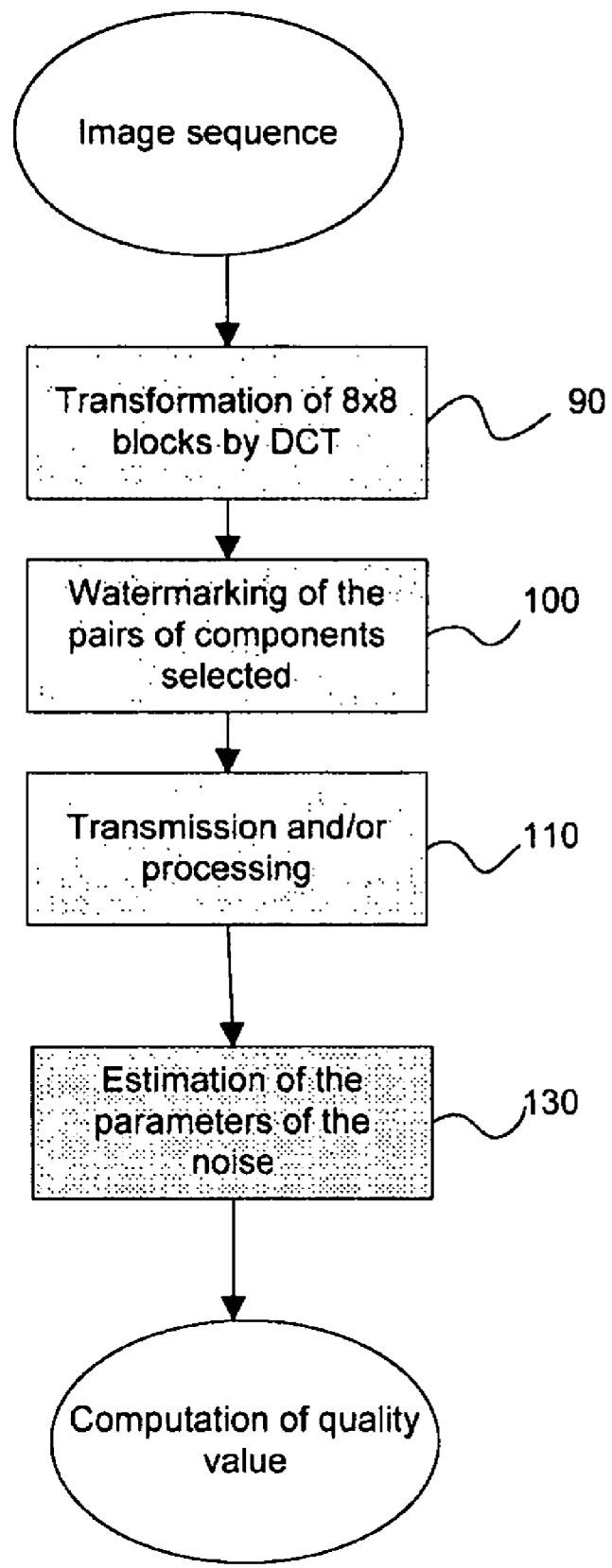
FIG. 1 represents a first embodiment of the method according to the invention.
Figure 2:
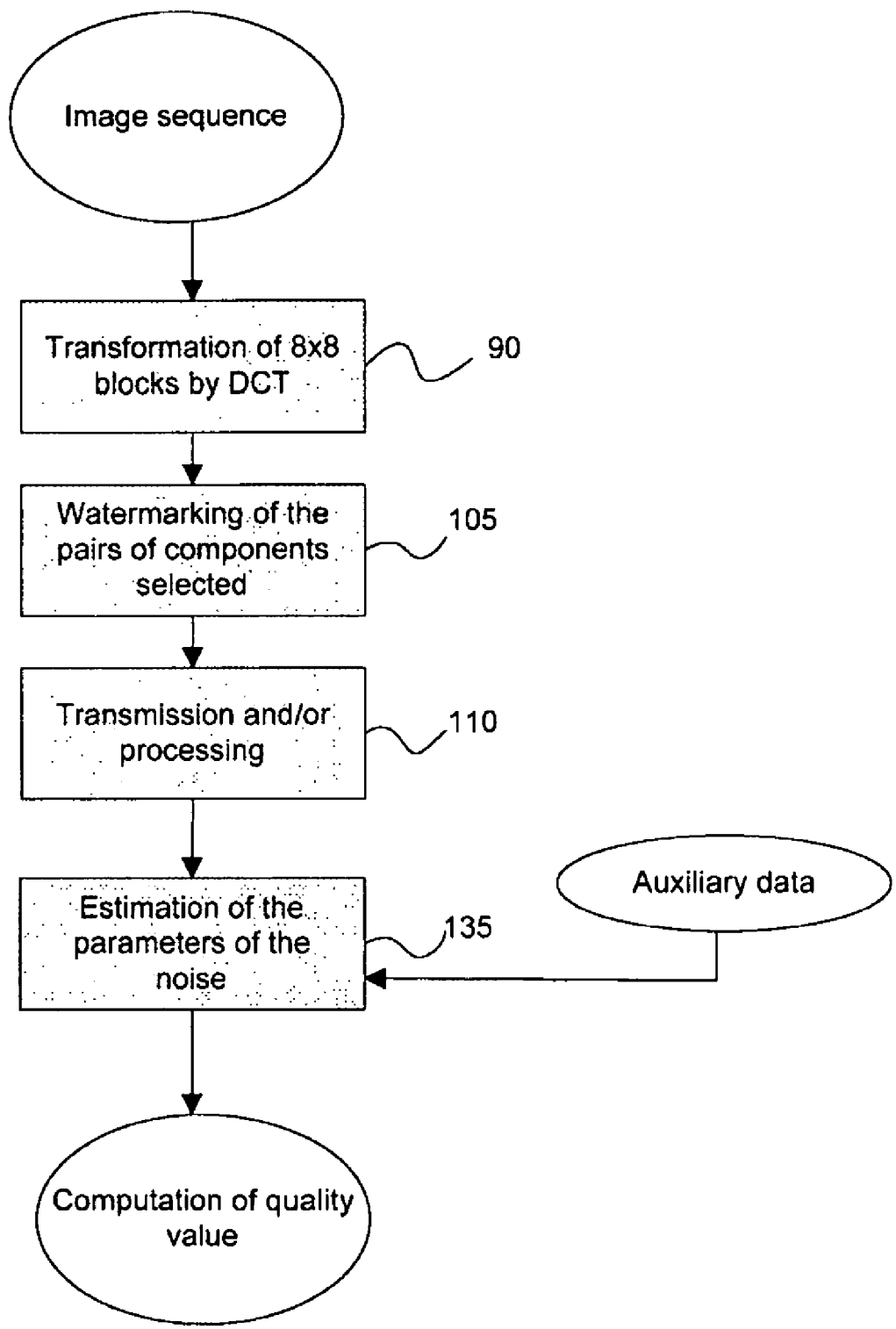
FIG. 2 represents a second embodiment of the method according to the invention.
Figure 3:
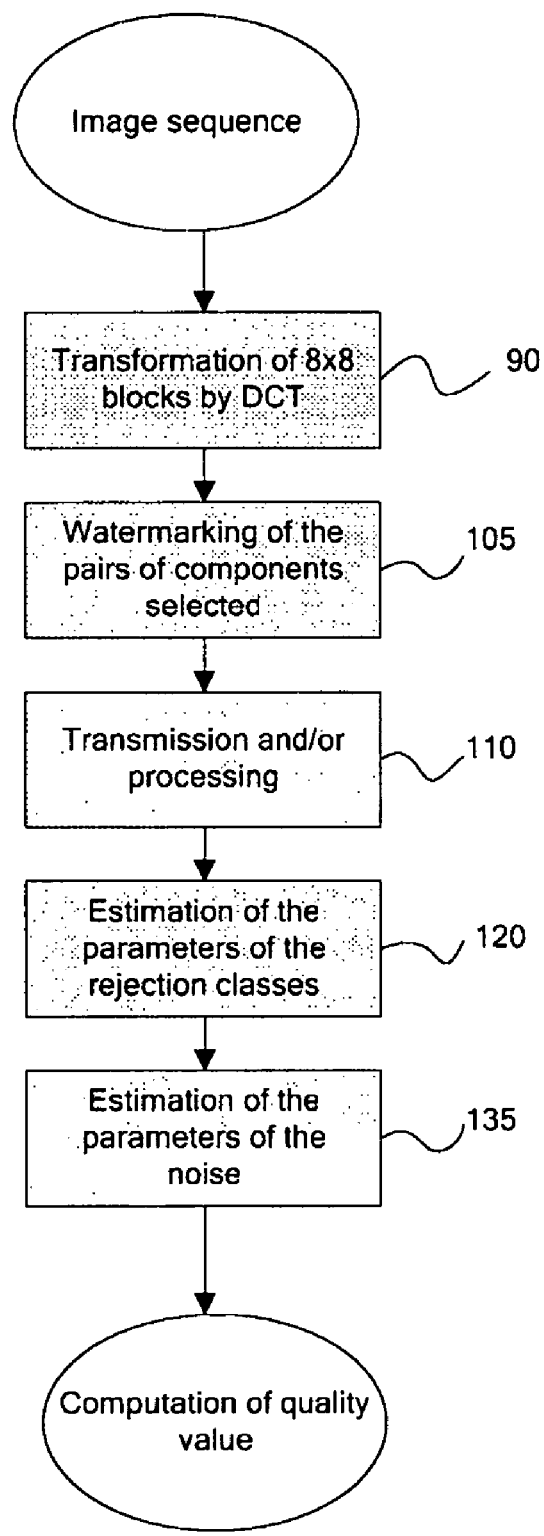
FIG. 3 represents a third embodiment of the method according to the invention.

In order to circumvent the need for the original video to be available during estimation of the quality and therefore to avoid putting in place a high bit rate channel, the method according to the invention consists in transmitting a test pattern (i.e. a reference signal known in advance by the receiver and the sender) in a transparent manner so as not to hinder the viewing of the useful video. For this purpose, certain components of the video signal are modified in a sufficiently weak manner in order that the modification be imperceptible to the eye. The method, illustrated by FIGS. 1 to 3, is described for an image of a sequence of images and can be applied to all the images of the sequence or to some of them, i.e. to a group of images. More generally, the method can be applied to a digital data set for example to data of audio type.

The image is decomposed, at step 90, according to a certain basis, for example by splitting it into blocks of 8 by 8 pixels, denoted 8×8 blocks, and by performing a DCT transformation on each of the 8×8 blocks. Each block of the image is identified by its spatial position (x,y), x being the abscissa of the block and y being its ordinate. This step 90 of decomposition makes it possible to generate a set of components or coefficients denoted $C(x, y, F_u, F_v)$, x and y denoting the spatial position (i.e. the coordinates of an 8×8 block) and $F_u$ and $F_v$ the horizontal and vertical frequency of the component. The components thus obtained are modified (i.e. watermarked) so that the modified components denoted $C^w(x, y, F_u, F_v)$ satisfy certain constraints. A particular spatial frequency $(f_u, f_v)$ having been selected, it is associated with a pair of two consecutive blocks with respective position (x,y) and (x+1,y).

According to a first embodiment described on FIG. 1, the components $C(x, y, f_u, f_v)$ and $C(x+1, y, f_u, f_v)$ of two consecutive blocks are modified at step 100 so that the following relation holds:

$$C^w(x+1, y, f_u, f_v) = C^w(x, y, f_u, f_v) \quad (\text{Eq0})$$

This relation can be satisfied for example by modifying a single of the two components in this instance $C^w(x+1, y, f_u, f_v)$ as follows:

$C^w(x, y, f_u, f_v) = C(x, y, f_u, f_v)$ (i.e. no modification of block x); and $C^w(x+1, y, f_u, f_v) = C(x, y, f_u, f_v)$ (i.e. modification of block x+1)

In a more general manner, the relation (Eq0) can be satisfied by modifying the two components in the following manner:

$$C^w(x, y, f_u, f_v) = \alpha C(x, y, f_u, f_v) + (1-\alpha) C(x+1, y, f_u, f_v)$$

$$C^w(x+1, y, f_u, f_v) = \alpha C(x, y, f_u, f_v) + (1-\alpha) C(x+1, y, f_u, f_v)$$

If $\alpha \leq 1$, the modifications above are relatively weak with respect to the original energy of each component, and therefore the modifications due to the watermarking process are almost imperceptible.

The components of the image modified by the watermarking process at step 100 are recovered after having possibly undergone modifications following their transmission and/or processing 110 (e.g. compression). For a given pair of watermarked components, the recovered pair of distorted values is as follows: $C^r(x+1, y, f_u, f_v)$ and $C^r(x, y, f_u, f_v)$. The list of blocks and of frequencies impacted by the watermarking process is assumed known at the receiver side. In general $C^r(x+1, y, f_u, f_v) \neq C^r(x, y, f_u, f_v)$ because of the degradation of the image caused by the compression or the transmission channel. The noise values impacting each of the two blocks are denoted $b(x, y, f_u, f_v)$ and $b(x+1, y, f_u, f_v)$. $C^w(x+1, y, f_u, f_v)$ being equal to $C^w(x, y, f_u, f_v)$, the following relation therefore holds:

$$C^r(x+1, y, f_u, f_v) - C^r(x, y, f_u, f_v) =$$
$$C^w(x, 1, y, f_u, f_v) + b(x+1, y, f_u, f_v) - C^w(x, y, f_u, f_v) -$$
$$b(x, y, f_u, f_v) = b(x+1, y, f_u, f_v) - b(x, y, f_u, f_v)$$

On the basis of the values of the components recovered after transmission and/or processing, it is possible to estimate the quality of the transmitted/processed video signal by estimating 130 the parameters of the noise and in particular its variance. If the noise affecting the 2 blocks are uncorrelated and follow the same law with zero mean and variance $\sigma^2$, then the observable $B(x, y, f_u, f_v) = b(x+1, y, f_u, f_v) - b(x, y, f_u, f_v)$ follows the same law with a variance $2\sigma^2$. If the noise affects the frequency ranges differently (that is to say if a $\sigma^2$ is a function of $f_u$ and $f_v$: $\sigma^2(f_u, f_v)$), it is possible to obtain an estimation of $\sigma^2(f_u, f_v)$ for each of the spatial frequencies. In the case of a coding of the sequence of images in accordance with the MPEG2 standard, the high frequencies are in particular more greatly distorted than the low frequencies. The variance of the noise $\sigma^2$ affecting each of the two blocks is an estimator of the MSE between original image and distorted image. The estimated MSE, denoted MŜE, is therefore calculated by summing the measurements performed for each block and each frequency as follows:

$$M\hat{S}E = \sum_{x,y,fu,fv} \frac{B(x, y, f_u, f_v)^2}{2N}, \quad (Eq\ 1)$$

N being the total number of pairs of components or number of samples (i.e. the number of pair of blocks, multiplied by the number of frequencies processed per block) modified by the watermarking process. The MSE can also be estimated by taking into account the component pairs arising from a group of several images if the quality is estimated on the basis of a group of several images. An estimation of PSNR can then obtained on the basis of the value MŜE. However, the PSNR and the MSE are fairly poorly correlated with the subjective quality. In order that the estimated value of the PSNR or of the MSE be further correlated with the subjective visual quality perceived by the human, the various elementary observations $B(x, y, f_u, f_v)$ can be combined and weighted according to a psychovisual model such as that described hereinafter.

Variability of Sensitivity with Luminance

The human eye being more sensitive to the distortions when the average luminance is low (dark zones) than when it is great (light zones), each of the elementary observations is therefore weighted by the average luminance of the corresponding block in the following manner:

$$D(x, y, f_u, f_v) = \gamma \frac{B(x, y, f_u, f_v)}{C^r(x, y, 0, 0)^p}$$

With for example, $$\gamma = \frac{1}{2.2} \text{ and } p = 0.65$$

Frequency Weighting

Each of the elementary observations is thereafter weighted by a coefficient dependent on the spatial frequency as follows:

$$F(x, y, f_u, f_v) = \beta(f_u, f_v) D(x, y, f_u, f_v)$$

for example, $\beta(f_u, f_v)$ can depend in a separable manner on the frequency amplitude and on the orientation. For example, $\beta(f_u, f_v) = \exp(\pi(u^2+v^2)g)$ where g is a constant which for example equals 2.604.

Masking

A masking on the frequency weighting $F(x, y, f_u, f_v)$ is then performed in the following manner:

For $F(x, y, f_u, f_v) < S$, $M_S(x, y, f_u, f_v) = S$, otherwise $M_S(x, y, f_u, f_v) = F(x, y, f_u, f_v)$, where S is a masking coefficient.

Temporal Weighting

According to a variant, a temporal filter is applied to the signal $M_S(t, x, y, f_u, f_v)$ to obtain a filter signal $N_S(t, x, y, f_u, f_v)$ Final Weighting A coefficient $\rho_P(x, y, f_u, f_v)$ representative of the point-wise quality is finally calculated on the basis of the values of $B(x, y, f_u, f_v)^2$ and of $N_S(t, x, y, f_u, f_v)$ (or of $M_S(t, x, y, f_u, f_v)$ if the temporal weighting is not applied) as follows:

$$\rho_P(x, y, f_u, f_v) = \frac{B(x, y, f_u, f_v)^2}{N_S(x, y, f_u, f_v)},$$

The final coefficient of estimation of the psychovisual quality is then defined in the following manner:

$$P = \sum_{x,y,fu,fv} \frac{\rho_P(x, y, f_u, f_v)}{N},$$

N being the number of samples of the set, i.e. of component pairs.

Figure 4:
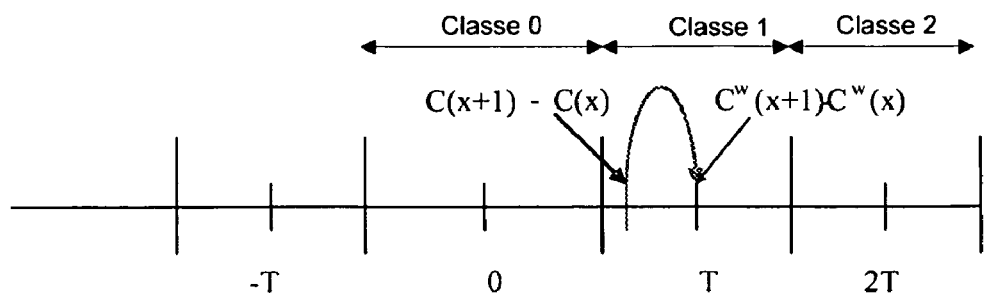
FIG. 4 illustrates the watermarking process using the rejection class concept.

According to a second embodiment described on FIGS. 2 and 3, the selected components $C(x, y, f_u, f_v)$ and $C(x+1, y, f_u, f_v)$ are modified, at watermarking step 105, in such a way that the following relations hold:

$$C^w(x+1, y, f_u, f_v) = C^w(x, y, f_u, f_v) + kT, \quad (Eq2a)$$

$$C^w(x, y, f_u, f_v) = C(x, y, f_u, f_v) \quad (Eq2b)$$

where: —T a watermarking force parameter;
—k is an integer, called rejection class, and defined by the following equation:

$$k = \text{round}\left(\frac{C(x+1, y, f_u, f_v) - C(x, y, f_u, f_v)}{T}\right)$$

where the function round(x) returns the value of x rounded to the nearest integer. Advantageously, this watermarking process 105 illustrated by FIG. 4 makes it possible to limit the visual impact of the watermarking step 105 in particular in the case where $C(x,y,f_u,f_v)$ and $C(x+1,y,f_u,f_v)$ have very different values. Since relations (Eq2a) and (Eq2b) hold, so also does the following relation: $|C^w(x+1, y, f_u, f_v) - C(x+1, y, f_u, f_v)| < T$. The force and therefore the visibility of the watermarking can therefore be supervised through the parameter T. The value of T depends on the frequency. For example, for the DC coefficient corresponding to a zero spatial frequency, T=1. The value of k possibly being different for each pair of components, it is denoted $k(x, y, f_u, f_v)$ hereinafter. The noise observable $B(x, y, f_u, f_v)$ is defined by the following equation 3:

$$B(x, y, f_u, f_v) = C^r(x+1, y, f_u, f_v) - C^r(x, y, f_u, f_v) - kT \quad (Eq3)$$

According to a variant, it is possible to watermark just the components whose associated value of k is low (i.e. less than a threshold τ in absolute value), the components of the other rejection classes not being modified.

This novel watermarking process makes it necessary to modify the process for estimating the quality. Specifically, if the procedure for estimating the noise 130, more precisely the variance of the noise, described for the first embodiment is applied without taking account of the classes, the estimation of the noise will be falsified in the cases where |k|>0. For this purpose, several procedures for estimating the noise at step 135 are proposed which take account of the rejection classes.

A first procedure, described on FIG. 2, consists in transmitting auxiliary data so as to make it possible to estimate the parameters of the noise and therefore of the MSE. According to a first variant, the data set, called the rejection map, which with each pair of watermarked components associates its membership class k is transmitted for example by a channel for auxiliary data. A rejection map is associated with an image of the sequence or with a group of images of the sequence, one or more rejection maps possibly being transmitted for one and the same sequence of images. To minimize the auxiliary information bit rate to be transmitted, the rejection maps can also be compressed with the aid of a conventional data compression algorithm (Huffman coding, zip etc.). In the case where the watermarking process modifies just the components whose value of k is less than τ, the value of the class is transmitted if k<τ otherwise a special marker is transmitted in the rejection maps. The pairs whose class is greater τ will not be taken into account in the calculation of the final quality measurement.

According to another variant, only general characteristics of the rejection maps are transmitted, such as for example the number of samples N(k) in each of the classes k. Let $k_{min}$ be the minimum value of k and $k_{max}$ the maximum value of k the estimation of the noise can then be carried out in the following manner:

class the N samples $C^r(x+1, y, f_u, f_v) - C^r(x, y, f_u, f_v)$ by increasing order; and assign to the class $k_{min}$ the $N(k_{min})$ samples of lowest value and to the class $k_{min}+1$ the $N(k_{min}+1)$ lowest samples from among the remaining samples, etc. After having assigned each sample to a class the estimation of the variance of the noise and therefore of the MSE is direct.

According to another variant, it is possible to transmit just a "digest" of the class information. Specifically, MŜE, the estimated MSE, being equal to $$\sum_{x,y,fu,fv} \frac{B(x, y, f_u, f_v)^2}{2N},$$

that is to say:

$$M\hat{S}E = \sum_{x,y,fu,fv} \frac{[C^r(x+1, y, f_u, f_v) - C^r(x, y, f_u, f_v) - k(x, y, f_u, f_v)T]^2}{2N}$$

$$= \sum_{x,y,fu,fv} \frac{[C^r(x+1, y, f_u, f_v) - C^r(x, y, f_u, f_v)]^2}{2N} +$$

$$\sum_{x,y,fu,fv} \frac{[k(x, y, f_u, f_v)T]^2}{2N} -$$

$$2 \sum_{x,y,fu,fv} \frac{[C^r(x+1, y, f_u, f_v) - C^r(x, y, f_u, f_v)]k(x, y, f_u, f_v)T}{2N}$$

If the noise itself has zero mean, the last term equals on average:

$$-2 \sum_{x,y,fu,fv} \frac{[k(x, y, f_u, f_v)T]^2}{2N}$$

and therefore the estimated MSE is equal to:

$$M\hat{S}E = \sum_{x,y,fu,fv} \frac{[C^r(x+1, y, f_u, f_v) - C^r(x, y, f_u, f_v)]^2}{2N} -$$

$$\sum_{x,y,fu,fv} \frac{[k(x, y, f_u, f_v)T]^2}{2N}$$

The first term can be calculated solely on the basis of the received data. It can also be weighted in accordance with the psychovisual model described previously. The second term can be calculated when sending (or estimated when receiving, but in this case the value might be marred by error), and transmitted to the receiver. The benefit relative to the transmission of the complete rejection maps is that the bit rate necessary for transmission is lower since a single value per image is transmitted.

The auxiliary data are transmitted for example by a video-related channel (for example user data of an MPEG stream), i.e. by a channel for auxiliary data which is different from the video channel. In this case the video channel and the auxiliary channel must be synchronized for example by applying one of the following synchronization mechanisms:

Watermarking: a numeral is watermarked into each of the images, this numeral being incremented at each image (time-stamp). This same numeral is transmitted with the rejection data for each image. On reception, the rejection data is associated with the image bearing the same numeral.

Intrinsic synchronization on the basis of the distributions of the data in the various classes: when the rejection map used for the estimation of the noise is not the right one, the estimated noise will be on average larger than with the correct estimation. The intrinsic synchronization mechanism consists in calculating a series of estimations according to (Eq3) for a given image, successively using each of the rejection maps of a given search span. The estimation finally employed will be that leading to the lowest $\sigma^2$. This procedure can also be used to detect anomalies in the transmission: if the same map is optimal for a series of successive images, it is possible to conclude a "freezing" of images. If for an image, the estimated quality is much lower than on the other contiguous images, whichever map is used, it is possible to conclude a point-wise transmission error (black image, stream error culminating in a "blocking effect" etc).

Visible test pattern: it is possible periodically to transmit a visible test pattern occupying a portion or the entirety of one or more images. In the stream of auxiliary data, the images corresponding to this test pattern are signalled. On reception, this test pattern is searched for (by correlation for example), and the corresponding auxiliary data is used for synchronization.

Transmission by the auxiliary channel of information allowing synchronization: it is possible to transmit via the auxiliary channel, at the same time as the rejection data, information on the nature of the corresponding images. It is possible for example to transmit a "digest" (signature) of each of the images of the sequence. On reception, the digest of each of the images received will be calculated, and the digest of the auxiliary data that is nearest to the calculated digest will be searched for. It is also possible, through the auxiliary channel, to signal particular events of the sequence (changes of shot, strong temporal variations of the sequence, etc.). On reception, these same events will be detected on the images received, and will be matched with the events signalled in the auxiliary data.

Return channel from the receiver to the watermarker: when the estimated noise becomes too strong, the receiver may suspect a desynchronization between the images and the rejection maps. It can then request by return pathway the retransmission of synchronization information, for example by any one of the above procedures (transmission of a test pattern, of a time-stamp in a watermark, of synchronizing info in the auxiliary channel etc.). This procedure avoids continual wastage of bandwidth of the auxiliary channel, or distortion of the quality of the image (test pattern).

A second procedure, described on FIG. 3, consists in estimating the noise without transmitting. A first solution consists, for each pair of watermarked components, in estimating 120 the membership class k of the pair in the following manner:

$$\hat{k} = \text{round}\left(\frac{C^r(x+1, y, f_u, f_v) - C^r(x, y, f_u, f_v)}{T}\right).$$

The noise taken into account to estimate the MSE in accordance with equation (Eq1) is then defined as follows:

$$\hat{B}(x, y, f_u, f_v) = C^r(x+1, y, f_u, f_v) - C^r(x, y, f_u, f_v) - \hat{k}T.$$

Two other procedures are proposed hereinafter. The observation, without a priori knowledge of the classes (that is to say without transmission via an auxiliary channel of the information on the rejection classes k), of the samples, i.e. of the values $C^r(x+1, y, f_u, f_v) - C^r(x, y, f_u, f_v)$, amounts to observing a mixture of random laws. Specifically the $C^r(x+1, y, f_u, f_v) - C^r(x, y, f_u, f_v)$ are random variables whose mean is $k(x, y, f_u, f_v)T$, and whose variance is the variance $\sigma^2$ of the noise. The proportions of the mixture (i.e. the number of variables with mean kT) and the variance of the noise $\sigma^2$ being unknown on reception, two procedures are proposed for estimating them and therefore for estimating the mean square error. The first procedure consists in solving a system with N unknowns, each of the equations being given by the calculation of a $k^{th}$ order moment. Let $\mu_k$ be the mean of class k (here $\mu_k = kT$). k depends on $(x, y, f_u, f_v)$ however the procedure makes a global estimation without seeking to estimate k for each quadruple $(x, y, f_u, f_v)$. The procedure consists in calculating the moments of order j denoted $M_j$ of the mixture of random variable as a function of the $p_k$ (i.e. the proportion of variables in the class k), $\mu_k$ and $\sigma^2$.

Let $M_j$ be the uncentred moment of order j of the mixture:

$$M_j = \frac{\sum_i X_i^j}{n}$$

($X_i$ being a variable of the mixture: $X_i = B(x, y, f_u, f_v)$.

The first 3 moments of the mixture are for example given by:

$$M_1 = \sum_k p_k \mu_k$$

$$M_2 = \sigma^2 + \sum_k p_k \mu_k^2$$

$$M_3 = 3\sigma^2 \left(\sum_k p_k \mu_k\right) + \sum_k p_k \mu_k^3$$

The unknowns are the $p_k$ and $\sigma^2$. There are therefore K+1 unknowns (K being the number of classes). At least K+1 equations are necessary in order to solve the system, therefore it is necessary to calculate the moments up to order K+1. The $p_i$ being related by the following equation:

$$\sum_i p_i = N$$

(total number of samples), it is therefore necessary to calculate the moments up to order K to get the K necessary additional equations. In the case of 3 classes, the optimal estimation of $\sigma^2$ is given by:

$$\sigma^2 = \frac{-\mu_0 \mu_1 \mu_2 + M_1(\mu_0 \mu_1 + \mu_0 \mu_2 + \mu_1 \mu_2) - M_2(\mu_0 + \mu_1 + \mu_2) + M_3}{3M_1 - (\mu_0 + \mu_1 + \mu_2)}$$

This formula is not valid when $p_0 = p_1 = p_2$ (division by zero). The system of equations then being degenerate; it is necessary to introduce the moment of order 4 to get a unique solution. In general, the system is symmetric, i.e. $\mu_1 = 0$, $\mu_0 = -\mu_2$ and $m_0 = -m_2$. Moreover in the usual cases $p_0 \approx p_2$. By solving the system of equations by using the moments of order 4, the value of the variance as follows is obtained:

$$\sigma^2 = -\frac{m_0^2}{6} \pm \frac{\sqrt{(m_0^4 + 36M_2^2 - 12M_4)}}{6} + M_2$$

This procedure can be generalized to an arbitrary number of classes by calculating a greater or lesser set of moments. It is also possible to use more equations than unknowns, and to use a least squares type procedure to solve the system with less uncertainty.

The second procedure consists of an iterative process of EM type ("Expectation Maximization"). This process carries out a classification of the samples at the same time as an estimation of the parameters 120 of each of the laws. Specifically, if one knew how to classify the data, that is to say allocate each sample the law from which it arises, the estimation of the parameters for each of the laws would be direct and therefore so also would the estimation 130 of the noise parameters. This information is not available, but it is possible to estimate it. Conversely, if the laws are known precisely, it is possible to classify the samples by calculating their a posteriori probability according to each of the laws. The general principle of an iterative process of EM type is the following:

1. Initialize the parameters of each of the laws: $p_k(0), \sigma^2(0)$;
2. Calculate, for each sample, its a posteriori probability according to each of the "approximate" laws;
3. Re-estimate the parameters of the laws, as a function of the a posteriori probability of the samples and of their values;
4. Repeat steps 2 and 3 a certain number of times until a certain stopping criterion is satisfied.

The process can be stopped when a predefined number of iterations is reached or when the difference between the value of a estimated at the current step and the value of $\sigma^2$ estimated at the preceding step is less than a predefined threshold. The iterative process can be applied to images of the sequence at regular intervals, e.g. once every m images. It can also be applied to several images so as to obtain a more global quality estimation. Two estimation algorithms are proposed, one denoted EM is deterministic, the other denoted SEM is stochastic. They differ by the data that they use to calculate the parameters of the laws:

- In the EM algorithm, each sample is weighted by its a posteriori probability according to the current law (i.e. arising from step 2).
- In the SEM algorithm, each sample is randomly allocated a class determined by simulation on the basis of the current laws.

Figure 5:
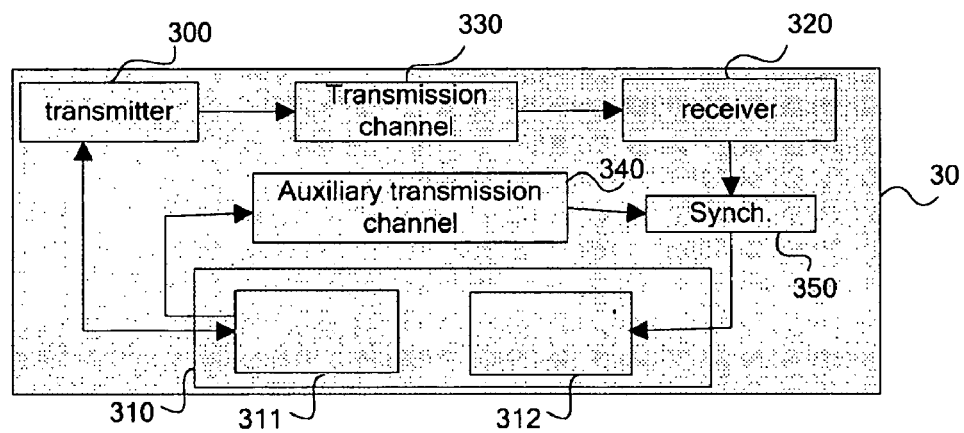
FIG. 5 represents a system for sending/receiving a digital data set or digital signal implementing the method according to the invention.

The invention also relates to a device for estimating the quality of a sequence of images implementing the above-described method of estimating quality. The invention relates furthermore to a system for transmitting/receiving a sequence of images or more generally a digital data set or digital signal. Such a device is illustrated by FIG. 5. In this figure, the modules represented are functional units, which may or may not correspond to physically distinguishable units. For example, these modules or some of them can be grouped together into a single component, or constitute functionalities of one and the same piece of software. Conversely, certain modules may possibly be composed of separate physical entities. The system 30 in particular comprises a transmitting module 300 for transmitting for example a compressed video sequence or more generally a digital signal over a transmission channel 330 to a reception module 320 and a device for estimating the quality of the signal received 310. The device 310 itself comprises several units including, on the transmitter side, a watermarking unit 311 and, on the receiver side, a unit for estimating the noise parameters 312. The watermarking module 311 of the device 310 cooperates with the transmitting module 300 to watermark the original digital signal, i.e. before transmission and/or processing, according to one of the watermarking processes described above. The estimation module 312 of the device 310 cooperates with the reception module 320 to estimate, according to one of the methods described above, the parameters of the noise added to the watermarked signal during its transmission and/or during its processing and to deduce from said parameters an estimation of the quality of the signal received by the reception module 320. Optionally, the system 30 comprises an auxiliary transmission channel 340 for transmitting in particular the rejection maps associated with the data set and generated by the watermarking unit 311 and a synchronization module 350 making it possible to synchronize the transmitted auxiliary data and the digital signal received by the reception module 320.

Of course, the invention is not limited to the exemplary embodiments mentioned above. In particular, the person skilled in the art can effect any variant in the embodiments set forth and combine them to benefit from their various advantages. Generally the method can be used to determine the quality of a signal other than a video signal for example an audio signal. This signal being watermarked before it is distorted, the watermarked pairs of components are used to estimate the noise level, i.e. the variance of the noise. A psycho-accoustic model can advantageously be combined with the method of estimating the variance of the noise.

The watermarking processes can be applied to a pair of components $C(x_1, y_1, f_{u1}, f_{v1})$ and $C(x_2, y_2, f_{u2}f_{v2})$ selected by pseudo-randomly drawing the spatial positions $x_1, y_1, x_2, y_2$ of the blocks to which they belong and the frequency positions $f_{u1}, f_{v1}, f_{u2}, f_{v2}$. In this case the two blocks selected are no longer necessarily consecutive.

The watermarking processes described above are repeated with several pairs of blocks and several frequencies. Preferably, all the blocks of an image are processed to get a more robust estimation of the noise in particular if the noise is not uniform. However in order that the method be faster it is conceivable to process only part of the blocks of an image. The choice of the frequencies and of the blocks impacted by the watermarking can be made in numerous ways. It is possible to choose preferentially to watermark a certain frequency range, if one knows that they have a more significant impact on the visual quality of the video. It is possible also to choose preferentially to watermark certain zones of the image that are more prone to degradations. The block of a pair of blocks can be selected again from another pair of blocks under the proviso of working with a different spatial frequency. Generally, several spatial frequencies can be selected for one and the same block or for one and the same pair of blocks.

The way to select the component pairs can vary from one image to another, or from one group of images to another. Consider for example that with each of the 8×8 blocks of an image is associated an index i in such a way that the index 0 is associated with the first block of the image (i.e. the block at the top left of the image) and that it is incremented by 1 when the blocks of the image are traversed from left to right and from top to bottom ("raster-scan" order). It is possible for example to select the component pairs from among the blocks of even index in one image and from among the blocks of odd index in the following image.

According to another variant, the component pairs $C(x_1, y_1, f_{u1}, f_{v1})$ and $C(x_2, y_2, f_{u2}, f_{v2})$ are selected from blocks located in different images of the sequence.

Advantageously, the spatial frequencies are selected in such a way that they are all represented, i.e. in such a way that all the frequencies are selected at least once.

The invention claimed is:

1. Method, performed by a processor, of watermarking a data set comprising the steps of:
- selecting, in said data set, at least one group of two data; and
- modifying at least one data of said group;
- wherein said data set is made up of blocks of transformed coefficients, each block being representative of a block of image data and wherein said at least one data is modified such that the difference between the modified data and the other data of said group possibly modified equals a predefined watermarking parameter multiplied by an integer number, called rejection class, associated with said group and equal to the integer nearest to the difference between said at least one data and the other data of said group before said modification divided by said watermarking parameter.

2. Method according to claim 1, wherein said transformed coefficients are discrete cosine transformed coefficients.

3. Method for estimating the quality after transmission and/or processing of a digital data set watermarked according to the method claim 1, characterized in that said quality is estimated on the basis of the transmitted and/or processed at least one group of two data and on the value of said predefined watermarking parameter.

4. Method according to claim 3, wherein said quality is estimated on the basis of auxiliary data representative of the rejection class associated to said at least one group.

5. Method according to claim 4, wherein said auxiliary data comprise, for each group of two data, the value of the associated rejection class.

6. Method according to claim 4, wherein said auxiliary data comprise, for each rejection class, the number of groups of two data whose associated rejection class equals said rejection class.

7. Method according to claim 4, wherein said auxiliary data comprise a value proportional to the sum over each group of two data of the squared value of the associated rejection class multiplied by said predefined parameter.

8. Method according to claims 3, wherein said quality is estimated based on psychovisual information.

9. Method according to claim 1, wherein said two data belong to two different blocks.

10. Method Transmission system for transmitting a data set over a transmission channel comprising transmission means, reception means and an estimation device for estimating the quality of said data set transmitted by said transmission means to said reception means, said estimation device comprising a watermarking unit for watermarking said data set before transmission and an estimation unit for computing a quality value characterized in that said watermarking unit comprises:
- means for selecting, in said data set, at least one group of two data wherein said data set is made up of blocks of transformed coefficients, each block being representative of a block of image data; and
- means for modifying at least one data of said group such that the difference between the modified data and the other data of said group possibly modified equals a predefined parameter, named watermarking parameter, multiplied by a number, called rejection class, associated with said group and equal to the integer nearest to the difference between said at least one data and the other data of said group before said modification divided by said watermarking parameter.

11. Device according to claim 10, wherein said estimation unit comprises means for estimating the quality of said transmitted data set on the basis of the transmitted and/or processed at least one group of two data and on the value of said predefined parameter.

* * * * *